UNITED STATES PATENT OFFICE.

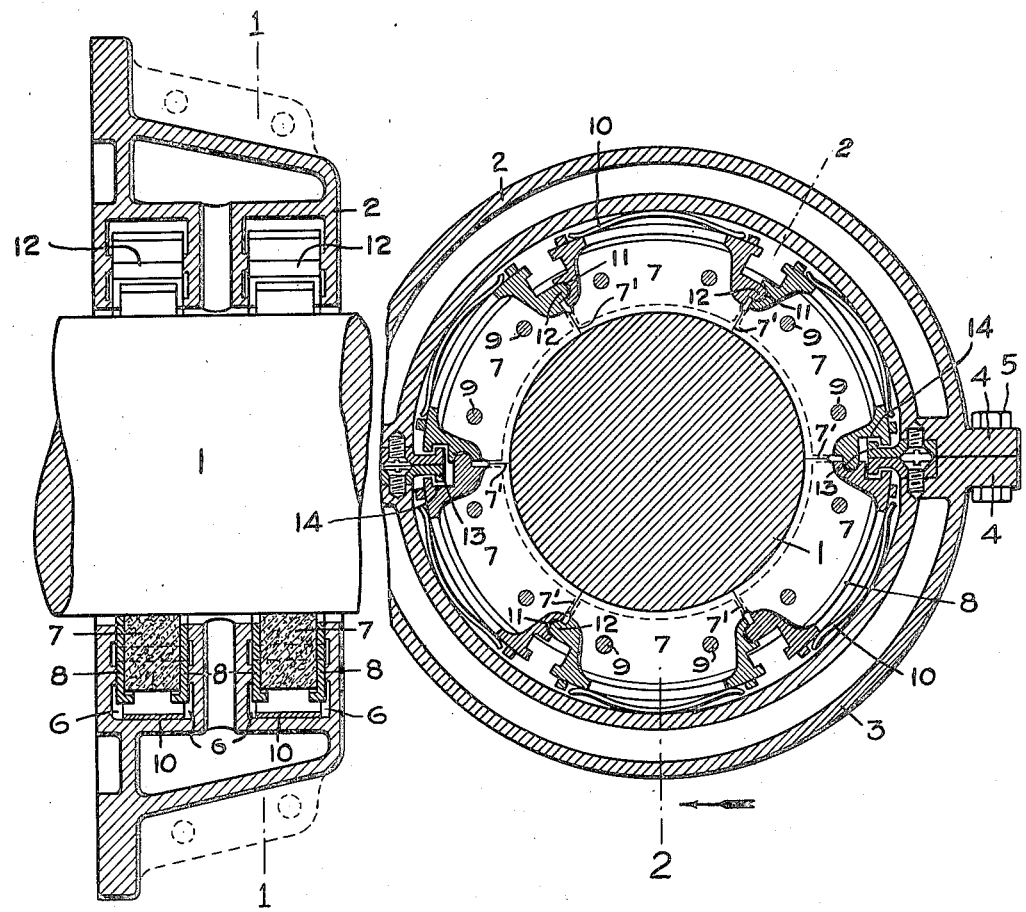

PAUL WAGNER, OF CHARLOTTENBURG, GERMANY, ASSIGNOR TO GENERAL ELECTRIC COMPANY, A CORPORATION OF NEW YORK.

SHAFT-PACKING.

1,104,588.　　　　Specification of Letters Patent.　　Patented July 21, 1914.

Application filed May 3, 1912. Serial No. 694,852.

*To all whom it may concern:*

Be it known that I, PAUL WAGNER, a subject of the King of Prussia, residing at Charlottenburg, Germany, have invented certain new and useful Improvements in Shaft-Packing, of which the following is a specification.

This invention relates to devices for making a fluid-tight joint at the point where a rotating shaft passes through the wall of a casing, such as the casing of an elastic-fluid turbine.

The object of the invention is to provide a packing of this type in which the packing ring or rings are made in segments, with springs to press them against the periphery of the shaft, and with articulated joints between the abutting ends of said segments, to permit radial movement of any given segment without disconnecting it from its fellows.

A further object is to provide a connection between the segmental packing ring or rings and the divided casing which incloses them, so that when said casing is removed from the shaft the segments contained in the removed portion thereof will be removed with the casing, to avoid their becoming disarranged. This mode of construction also serves to prevent the packing from revolving with the shaft.

In the accompanying drawing, Figure 1 is a cross section of a shaft provided with my improved packing, taken on the line 1—1, Fig. 2; and Fig. 2 is a longitudinal section on the line 2—2, Fig. 1.

At the point where the packed joint is to be provided, the shaft 1 is surrounded with a casing made in separable portions or halves 2, 3, each half having a flange or flanges 4 for the bolts 5 which hold them together. The casing is formed with one or more internal channels 6 in which the packing rings are housed. Each ring is composed of a plurality of segments, six being illustrated in the drawing. Each segment consists of a block 7 of some suitable material to make a good fluid-tight joint with the periphery of the shaft such for instance as carbon, said block being clamped between the cheeks of a holder 8, by means of bolts or rivets 9, and these holders have a sliding fit in the channels 6. Between the back of each segment and the outer wall of the channel is a flat spring 10 which biases the segment toward the shaft. The abutting ends of the blocks 7 are faced off on radial planes 7' and can be shaved off at these points when the wear of the surfaces making contact with the shaft renders it necessary to readjust the segments to preserve the tightness of the joint.

In order to maintain the segments in operative relation to one another, and yet permit any one of them to move radially when a lateral thrust of the shaft makes this necessary, the ends of the segments are provided with articulated joints, constructed preferably as shown in the drawing. At one end of each segment is a transverse groove 11 and at the other end a transverse rounded rib or projection 12. The rib or projection on one segment interlocks with the groove or socket on the next and forms a species of joint or articulation which allows a certain independence of radial movement for the segments. There is also provided a certain amount of play in a peripheral direction of the shaft, in order to permit shrinkage in this direction when the segments are adjusted for wear. I provide also certain means for connecting the segmental packing rings with the halves of the casing, whereby when the upper half of said casing is lifted off the segments contained therein will be removed with it. The preferred form of such connection is shown in the drawing and consists of a finger 13 secured to the casing and extending into the space between the adjacent ends of two segments, where said finger engages with a notch 14 in the segment contained in that half of the casing to which said finger is attached. This construction prevents the parts from becoming separated when the upper half of the casing is lifted off. These fingers are preferably located at the division joint between the halves of the casing, as shown. Incidentally, they also prevent the friction between the shaft and the packing rings from causing said rings to revolve with said shaft.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A shaft packing comprising a segmental ring, the segments of which have radially disposed ends arranged in engagement with each other, holders for the segments, articulated joints between the adjacent ends of the holders, and spring means for pressing the segments toward the shaft.

2. A shaft packing comprising a segmental ring, the segments of which have radially disposed ends arranged in engagement with each other, holders for the segments, articulated joints between the adjacent ends of the holders, the members of said joints being slightly spaced apart, and means for pressing the segments toward the shaft.

3. A shaft packing composed of a segmental ring provided with articulated joints between the adjacent ends of the segments, said joints comprising a substantially semicircular groove in the end of one segment and a rib on the adjacent end of the next segment having parallel sides terminating in an end which is shaped to coöperate with said groove, a divided casing, and fingers carried by the casing and engaging with segments of the ring.

4. A shaft packing composed of a segmental ring, the segments of the ring having radially disposed ends that are in engagement with each other, and holders for the segments provided with a transverse rib at one end having a substantially semi-circular cross-section and with a transverse groove of similar cross-section at the other end, said ribs and grooves interlocking to form articulated joints having clearance spaces between the ribs and the bottoms of the grooves.

5. A shaft packing composed of a segmental ring, a divided casing therefor, and means for retaining in each portion of said casing the segments contained therein when said portion is removed from the shaft.

6. A shaft packing composed of a segmental ring, a divided casing therefor, and fingers on said casing engaging with segments of said ring.

7. A shaft packing composed of a segmental ring, a divided casing therefor, and fingers on each half of said casing entering spaces between adjacent segments and engaging with the segments in said half of the casing.

8. A shaft packing comprising a segmental ring, holders for the segments of the ring, articulated joints between the adjacent ends of the holders, a divided casing in which the holders are mounted, a spring arranged between each holder and the casing that presses the holder and the ring segment toward the shaft, and means for retaining the group of segments in the portion of the casing in which they are mounted when said portion is removed.

In witness whereof, I have hereunto set my hand this 13th day of April, 1912.

PAUL WAGNER.

Witnesses:
GEO. N. ÜBERLEK,
GUST. HÜLBROCK.